US009641352B2

(12) United States Patent
Song et al.

(10) Patent No.: US 9,641,352 B2
(45) Date of Patent: May 2, 2017

(54) PACKET FORWARDING

(71) Applicant: Hangzhou H3C Technologies Co., Ltd., Hangzhou, Zhejiang (CN)

(72) Inventors: Xiaoheng Song, Beijing (CN); Guoliang Zheng, Beijing (CN)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 153 days.

(21) Appl. No.: 14/401,531

(22) PCT Filed: Sep. 4, 2013

(86) PCT No.: PCT/US2013/082906
§ 371 (c)(1),
(2) Date: Nov. 16, 2014

(87) PCT Pub. No.: WO2014/036938
PCT Pub. Date: Mar. 13, 2014

(65) Prior Publication Data
US 2016/0261428 A1     Sep. 8, 2016

(30) Foreign Application Priority Data
Sep. 5, 2012    (CN) .......................... 2012 1 0325271

(51) Int. Cl.
*H04L 12/28*     (2006.01)
*H04L 12/46*     (2006.01)
(Continued)

(52) U.S. Cl.
CPC ........ *H04L 12/4633* (2013.01); *H04L 45/745* (2013.01); *H04L 61/103* (2013.01)

(58) Field of Classification Search
CPC . H04L 12/4633; H04L 45/745; H04L 61/103; H04L 61/2592
See application file for complete search history.

(56) References Cited

U.S. PATENT DOCUMENTS 8,693,323 B1 * 4/2014 McDysan ............... H04L 45/50
370/230
2004/0013118 A1 * 1/2004 Borella ............... H04L 12/4633
370/395.2
(Continued)

FOREIGN PATENT DOCUMENTS

CN     101227361     7/2008
CN     102143026     8/2011
(Continued)

OTHER PUBLICATIONS

International Search Report and Written Opinion dated Dec. 12, 2013 issued on PCT Patent Application No. PCT/CN2013/082906 dated Sep. 4, 2013, The State Intellectual Property Office. P.R. China.
(Continued)

*Primary Examiner* — Abdelnabi O Musa
(74) *Attorney, Agent, or Firm* — Hewlett Packard Enterprise Patent Department

(57) ABSTRACT

An ED within EVI network establishes an EVI tunnel for bearing Ethernet packets and an EVI extension tunnel for bearing IP packets, where both the EVI tunnel and the EVI extension tunnel are connected to a peer ED. The ED sends an Ethernet packet for layer 2 forwarding in an EVI forwarding instance through the EVI tunnel; and sendsan IP packet for layer 3 forwarding in the EVI forwarding instance through the EVI extension tunnel.

14 Claims, 4 Drawing Sheets

(51) Int. Cl.
    *H04L 12/741*    (2013.01)
    *H04L 29/12*     (2006.01)

(56) References Cited

U.S. PATENT DOCUMENTS

| | | |
|---|---|---|
| 2005/0195780 A1 | 9/2005 | Haverinen et al. |
| 2005/0195813 A1 | 9/2005 | Ambe et al. |
| 2006/0146832 A1 | 7/2006 | Rampal et al. |
| 2006/0193248 A1* | 8/2006 | Filsfils .................... H04L 45/04 370/216 |
| 2007/0133406 A1* | 6/2007 | Vasseur .................. H04L 45/02 370/230 |
| 2012/0099602 A1* | 4/2012 | Nagapudi ........... H04L 12/4633 370/401 |
| 2012/0176934 A1* | 7/2012 | Farinacci ............ H04L 12/4641 370/254 |

FOREIGN PATENT DOCUMENTS

| | | |
|---|---|---|
| CN | 102368726 | 3/2012 |
| CN | 102413061 | 4/2012 |
| CN | 102546349 | 7/2012 |
| CN | 102611634 | 7/2012 |

OTHER PUBLICATIONS

Extended European Search Report, EP Patent Application No. 13835315.6, Date: Mar. 7, 2016, pp. 1-10.

\* cited by examiner

PACKET FORWARDING

CROSS-REFERENCE TO RELATED APPLICATION

The present application is a 371 application of International Application No. PCT/CN2013/082906 filed on Sep. 4, 2013 and entitled "Packet Forwarding," which claims benefit of Chinese Patent App. No. CN 201210325271.5 filed on Sep. 5, 2012.

BACKGROUND

Ethernet Virtual Interconnection (EVI) is an Ethernet interconnection technology and is used for the interconnection among user data centers distributed in multiple regions. The EVI can extend Virtual Local Area Networks (VLANs) among different sites and construct independent EVI forwarding instances in the extended VLANs. The EVI forwarding instances are identified with respective network IDs that are numbered uniformly and globally. The packet forwarding in different EVI forwarding instances on a certain device is separated.

A bidirectional EVI tunnel for bearing Ethernet packets is established between Edge Devices (EDs) of different sites in an EVI network. For the bidirectional EVI tunnel between EDs in the same EVI forwarding instance, an EVI link associated with the EVI forwarding instance is established. In this way, the Ethernet packet is forwarded between the EDs in the EVI forwarding instance through two EVI tunnels associated with the same EVI link.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to. The term "based on" means based at least in part on.

Figure 1:
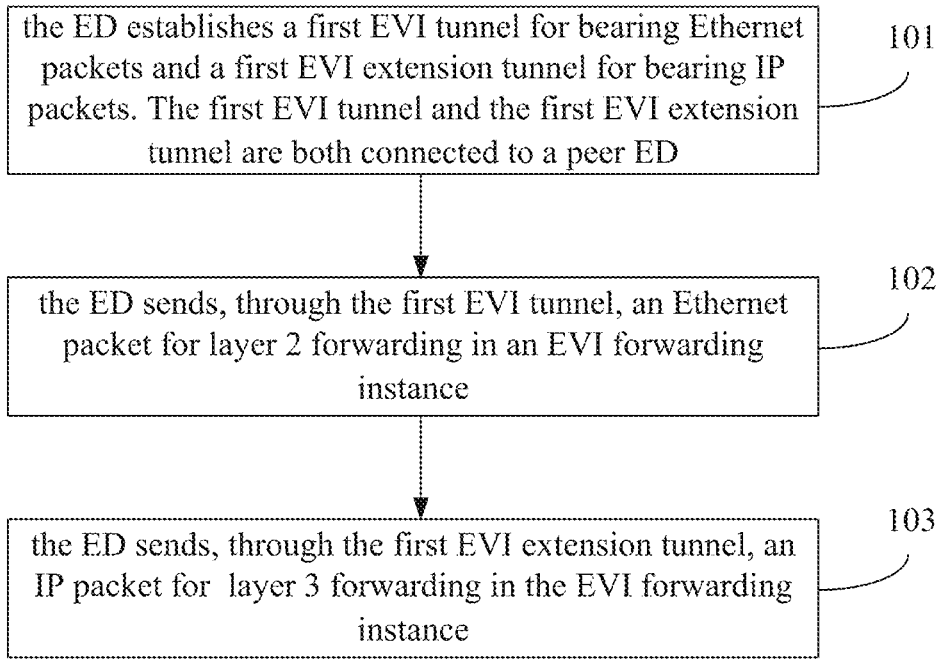
FIG. 1 is a flowchart illustrating a method for forwarding a packet by an ED according to examples of the present disclosure.

FIG. 1 is a flowchart illustrating a method for forwarding a packet by an Edge Device (ED) according to examples of the present disclosure. Referring to FIG. 1, the method includes following blocks.

Block 101, the ED establishes a first Ethernet Virtual Interconnection (EVI) tunnel for bearing Ethernet packets and a first EVI extension tunnel for bearing IP packet. The first EVI tunnel and the first EVI extension tunnel are both connected to a peer ED.

Block 102, the ED sends, through the first EVI tunnel, an Ethernet packet for layer 2 forwarding in an EVI forwarding instance.

Block 103, the ED sends, through the first EVI extension tunnel, an IP packet for layer 3 forwarding in the EVI forwarding instance.

Figure 2:
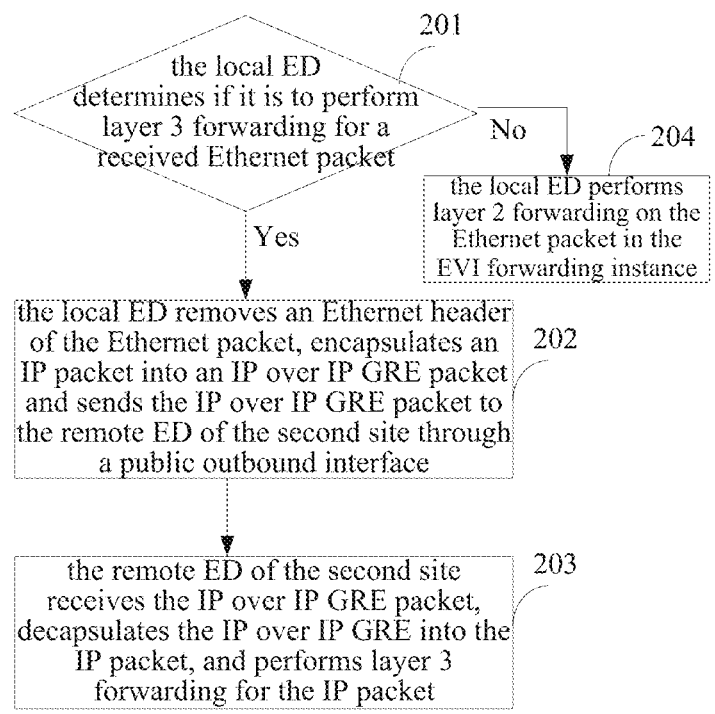
FIG. 2 is a flowchart illustrating a packet forwarding method according to examples of the present disclosure.

FIG. 2 is a flowchart illustrating a packet forwarding method according to examples of the present disclosure. For example, in an EVI forwarding instance, a local ED is connected to a first site and a remote ED is connected to a second site. A host in the first site and a host in the second site respectively belong to different Virtual Local Area Networks (VLANs). A process for accessing the host in the second site by the host in the first site includes the following blocks.

In block 201, the local ED determines if it is to perform layer 3 forwarding for a received Ethernet packet.

The Ethernet packet received by the local ED may be an Ethernet packet received from the first site, or it may be an Ethernet packet obtained through decapsulating a received Ethernet over IP GRE packet. If a layer 2 forwarding item (i.e a MAC address entry) that is obtained by the local ED based on a VLAN ID and a destination MAC address of the Ethernet packet has a layer 3 forwarding attribute, block 201 may be followed by blocks 202 and 203 where the local ED determines to perform layer 3 forwarding on the Ethernet packet.

If the layer 2 forwarding item that is obtained by the local ED from the MAC table based on the VLAN ID and the destination MAC address of the Ethernet packet does not have a layer 3 forwarding attribute, block 201 may be followed by block 204 where the local ED performs layer 2 forwarding on the Ethernet packet in the EVI forwarding instance.

In block 202, the local ED removes an Ethernet header of the Ethernet packet, encapsulates an IP packet into an IP over IP GRE packet, and sends the IP over IP GRE packet to the remote ED of the second site through a public outbound interface.

The local ED searches a Forwarding Information Base (FIB) based on a destination IP address of the IP packet for a FIB item (entry) containing encapsulation information of an EVI extension tunnel and an EVI public outbound interface, adds an IP GRE extension tunnel header and a public layer 2 header for the IP packet based on the encapsulation information of the EVI extension tunnel, encapsulates the IP packet into an IP over IP GRE packet, and sends the IP over IP GRE packet through the EVI public outbound interface.

In block 203, the remote ED of the second site receives the IP over IP GRE packet, decapsulates the IP over IP GRE into the IP packet, and performs layer 3 forwarding for the IP packet.

The remote ED of the second site decapsulates the IP over IP GRE packet into the IP packet, searches a FIB based on the destination IP address of the IP packet for a FIB item containing Ethernet encapsulation information and a VLAN outbound interface, encapsulates the IP packet into an Ethernet packet based on the Ethernet encapsulation information, and sends the Ethernet packet through the VLAN outbound interface, thereby sending the Ethernet packet to the host in the second site.

A process of accessing the host of the first site by the host of the second site is similar to the process described in blocks 201 to 203.

If the local ED and the remote ED receive an Address Resolution Protocol (ARP) packet encapsulated in an Ethernet over IP GRE packet, a FIB item containing the encapsulation information of the EVI extension tunnel and the public outbound interface is configured in the FIB. If the local ED and the remote ED receive the ARP packet in respective sites, a FIB item containing the Ethernet encapsulation information and the VLAN outbound interface is configured in the FIB.

In examples of the present disclosure, a bidirectional EVI extension tunnel is established between EDs when a bidirectional EVI tunnel is established between the EDs.

The bidirectional EVI tunnel between the EDs is associated with a first EVI link in the EVI forwarding instance, and the bidirectional EVI extension tunnel between the EDs is associated with a second EVI link in the EVI forwarding instance. Ethernet packets are sent/received between the EDs through two EVI tunnels associated with the first EVI link, and IP packets are sent/received between the EDs through two EVI extension tunnels associated with the second EVI link. In this way, the first EVI link between the EDs is used for sending/receiving Ethernet packets for layer 2 forwarding in the EVI forwarding instance, and the second EVI link between the EDs is used for sending/receiving IP packets for layer 3 forwarding in the EVI forwarding instance.

Figure 3A:
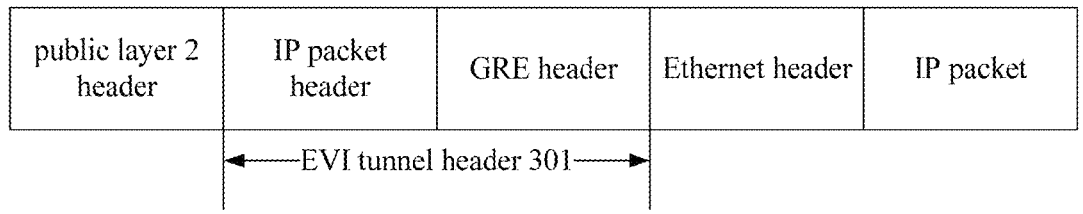
FIG. 3A is a schematic diagram illustrating the format of an Ethernet over IP Generic Routing Encapsulation (GRE) packet according to examples of the present disclosure.

FIG. 3A is a schematic diagram illustrating the format of an Ethernet over IP GRE packet borne by an EVI tunnel according to examples of the present disclosure. In the Ethernet over IP GRE packet, an IP packet header and a GRE header constitutes an EVI tunnel header 301. A GRE field in the GRE header of the EVI tunnel header 301 indicates that the type of payload packet is Ethernet type.

Figure 3B:
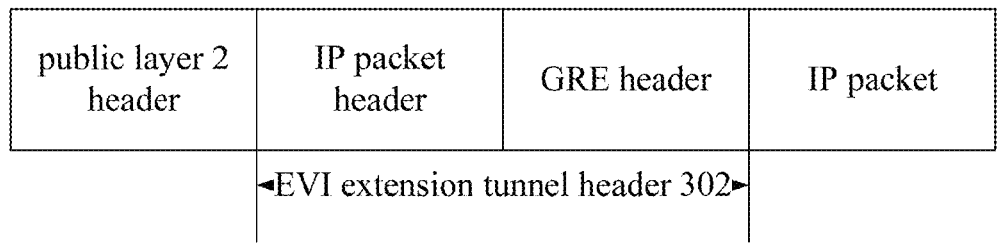
FIG. 3B is a schematic diagram illustrating the format of an IP over IP GRE packet according to examples of the present disclosure.

FIG. 3B is a schematic diagram illustrating the format of an IP over IP GRE packet borne by an EVI extension tunnel according to examples of the present disclosure. In the IP over IP GRE packet, an IP packet header and a GRE header constitute an EVI extension tunnel header 302. A GRE field in the GRE header of the EVI extension tunnel header 302 indicates that the type of payload packet is 0×4, that is, IP type.

The present disclosure is illustrated hereinafter with reference to examples.

Figure 4:
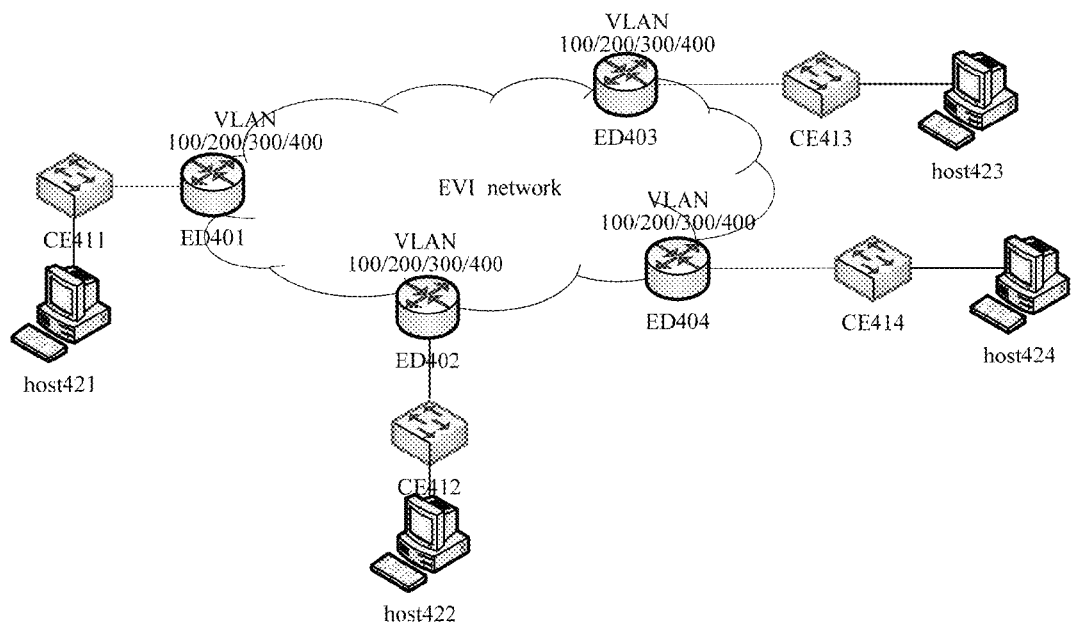
FIG. 4 is a schematic diagram illustrating inter-VLAN packet forwarding among different sites in an EVI network according to examples of the present disclosure.

FIG. 4 is a schematic diagram illustrating inter-VLAN packet forwarding among different sites in an EVI network according to examples of the present disclosure.

In order to perform layer 3 forwarding for a packet, a layer 3 interface is configured respectively on user VLAN interfaces of ED401 to ED404, and an IP address and a MAC address are configured for each layer 3 interface so as to ensure that the IP address of each layer 3 interface and IP addresses of hosts in the same VLAN in each site belong to the same network segment. A bidirectional EVI tunnel and a bidirectional EVI extension tunnel are respectively established between the ED401, the ED402, the ED403, and the ED404.

For example, a host 421 and a host 423 are located in different sites of an EVI forwarding instance. Before the host 421 accesses the host 423, the host 421 determines that the host 421 and the host 423 do not belong to the same VLAN. The host 421 broadcasts an ARP request packet for a MAC address corresponding to an IP address of a configured VLAN100 gateway.

A Customer Edge 411 (CE411) learns a MAC address of the host 421 based on a source MAC address in an Ethernet header of the received ARP request packet, and forwards the received ARP request packet.

The ED401 receives the ARP request packet from the host 421, and determines, based on a VLAN to which the ARP request packet belongs and a port1, an EVI forwarding instance 1 to which the ARP request packet belongs. The ED401 records a relationship between the MAC address and the IP address of the host 421 in an ARP item (entry) based on a Sender MAC address and a Sender IP address of the ARP request packet, records a MAC item (entry) of the host 421 in a MAC table of the EVI forwarding instance 1 based on the source MAC address in the Ethernet header of the ARP request packet, and configures host routing of the host 421 in a FIB. In the FIB of the ED401, a FIB item for describing the host routing of the host 421 is shown in Table 1.

TABLE 1

| Destination/Mask | Next-hop | Outbound-Interface | ARP index |
|---|---|---|---|
| 1.0.0.7/32 | 1.0.0.3 | port1/vlan 100 | ARP1 |

In the FIB item shown in d an index ARP1 of the ARP item generated based on the ARP request packet are taken Table 1, the port 1receiving the ARP request packet is taken as an outbound interfac e of the VLAN100. The VLAN100 to which the ARP request packet belongs an as Ethernet encapsulation information.

The ED401 generates an ARP response packet and sends the ARP response packet to the CE411. In the ARP response packet, the Sender MAC address is the MAC address of the VLAN100 gateway on the ED401, the Sender IP address is the IP address of the VLAN100 gateway, and a target IP address and a target MAC address are respectively the IP address and the MAC address of the host 421. A source MAC address in an Ethernet header of the ARP response packet is the MAC address of the VLAN100 gateway, and a destination MAC address is the MAC address of the host 421.

The CE411 learns the MAC address of the VLAN100 gateway based on the source MAC address in the Ethernet header of the ARP response packet, and sends the ARP response packet to the host 421 based on the learned MAC address of the host 421.

The host 421 receives the ARP response packet, and records a relationship between the IP address and the MAC address of the VLAN100 gateway in the ARP table based on the Sender MAC address and Sender IP address of the ARP response packet.

The host 421 sends the ED401 an Ethernet packet containing the IP packet to be sent to the host 423. In the IP packet for the host 423 from the host 421, a source IP address is the IP address 1.0.0.7 of the host 421, and a destination IP address is the IP address 3.3.3.9 of the remote host 423.

The ED401 determine to perform layer 3 forwarding based on a layer 2 forwarding entry matching the VLAN ID and the destination MAC address in the Ethernet header.

If the ED401 does not find a FIB entry matching the destination IP address of the Ethernet packet in the FIB based on the destination IP address of the Ethernet packet, the ED401 broadcasts an ARP request packet for the MAC address of the host 423. In the ARP request packet broadcasted by the ED401, the Sender IP address and the Sender MAC address are the IP address and the MAC address of the ED401, and the target IP address is the IP address of the host 423. For example, the IP address of the ED401 is 3.3.3.3. The ED401 adds VLAN 300, ID of VLAN to which the IP address 3.3.3.3 belongs, to the Ethernet header of the ARP request packet. The ED401 adds the public layer 2 header and the EVI tunnel header to the ARP request packet based on an EVI tunnel between the ED401 and a peer ED in the EVI forwarding instance, encapsulates the ARP request packet into an Ethernet over IP GRE packet, and sends the Ethernet over IP GRE packet containing the ARP request packet to the ED402-ED404 through their respective EVI tunnels.

The ED403 receives the Ethernet over IP GRE packet containing the ARP request packet through the EVI tunnel between the ED403 and the ED401, decapsulates the Ethernet over IP GRE packet into the ARP request packet, determines, based on the VLAN300 to which the ARP request packet belongs, the EVI forwarding instance 1 to which the ARP request packet belongs, and records an item of the MAC address of the VLAN300 gateway on the ED401 in the MAC table of the EVI forwarding instance 1 so that the item may be used for the layer 2 forwarding in the EVI forwarding instance 1. The ED403 configures an ARP item based on the ARP request packet, and creates a new FIB item in the FIB. The FIB item created by the ED403 is shown in Table 2.

TABLE 2

| Destination/Mask | Next-hop | Outbound-Interface | ARP index |
| --- | --- | --- | --- |
| 3.3.3.3/32 | 3.3.3.25 | port2/Tunnel2 | |

In Table 2, the tunnel index Tunnel2 of the EVI extension tunnel between the ED403 and the ED401 is taken as the encapsulation information of the EVI extension tunnel. The port2 of the EVI extension tunnel is taken as an EVI network outbound interface, which is connected to an EVI public network. The ED402 and the ED 404 each receives the Ethernet over IP GRE packet containing the ARP request packet, decapsulates the Ethernet over IP GRE packet into the ARP request packet, configures a FIB item according to the ARP request packet, and then forwards the ARP request packet to its local site.

According to the EVI tunnel header of the received Ethernet over IP GRE packet, the ED403 determines that the peer ED is the ED401, and then records the tunnel index Tunnel2 of the EVI extension tunnel between the ED403 and the ED401 in the FIB item shown in Table 2. Or, the ED403 associates the EVI tunnel with the EVI extension tunnel between the ED403 and the ED401, identifies the EVI tunnel connected to the peer ED according to the EVI tunnel header of the received Ethernet over IP GRE packet, and records the tunnel index Tunnel2 of the associated EVI extension tunnel in Table 2. The ED403 forwards the ARP request packet obtained by decapsulating the Ethernet over IP GRE packet.

The CE413 receives the ARP request packet. If the CE413 does not find a destination MAC item, the CE413 learns the MAC address of the VLAN300 gateway on the ED401. The CE413 broadcasts the received ARP request packet on other ports of the VLAN300.

The host 423 receives the ARP request packet broadcasted by the CE413, and records the relationship between the MAC address and the IP address of the VLAN300 gateway on the ED401 in an ARP item based on the Sender MAC address and the Sender IP address of the ARP request packet. The host 423 sends an ARP response packet. The Sender MAC address of the ARP response packet is the MAC address of the host 423, and the Sender IP address is the IP address of the host 423. The source MAC address in the Ethernet header of the ARP response packet is the MAC address of the host 423, and the destination MAC address is the MAC address of the VLAN300 gateway on the ED401.

The CE413 receives the ARP response packet from the host 423, learns the

MAC address of the host 423 according to the source MAC address of the ARP response packet, and sends the ARP response packet to the ED403 based on the destination MAC address of the ARP response packet.

The ED403 receives the ARP response packet from the host 423, learns the MAC address of the host 423 based on the source MAC address of the ARP response packet, and saves the ARP information of the host 423. The ED403 updates the FIB, and configures the FIB item information of host routing of the host 423 in the FIB. The FIB item updated by the ED403 is shown in Table 3.

TABLE 3

| Destination/Mask | Next-hop | Outbound-Interface | ARP index |
| --- | --- | --- | --- |
| 3.3.3.3/32 | 3.3.3.25 | port2/Tunnel 2 | |
| 3.3.3.9/32 | 3.3.3.25 | port1/VLAN 300 | ARP3 |

In the newly created FIB item, the VLAN300 to which the ARP response packet belongs and an ARP index ARP3 generated based on the ARP response packet are taken as the Ethernet encapsulation information, and the port 1receiving the ARP response packet is taken as a VLAN outbound interface.

The ED403 adds the public layer 2 header and the EVI tunnel header for the ARP response packet based on the MAC table of the EVI forwarding instance (that is, a layer 2 forwarding table), encapsulates the ARP response packet into an Ethernet over IP GRE packet, and sends the Ethernet over IP GRE containing the ARP response packet to the ED401 through the EVI tunnel between the ED403 and the ED401.

The ED401 receives the Ethernet over IP GRE packet containing the ARP response packet, determines the EVI forwarding instance 1 based on the VLAN300 to which the ARP response packet belongs, and configures an ARP item based on the ARP request packet. The ED401 updates the FIB, configures the FIB item information of host routing of the host 423 in the FIB. The FIB item updated by the ED401 is shown in Table 4.

TABLE 4

| Destination/Mask | Next-hop | Outbound-Interface | ARP index |
| --- | --- | --- | --- |
| 1.0.0.7/32 | 1.0.0.3 | port1/vlan 300 | ARP1 |
| 3.3.3.9/32 | 3.3.3.3 | port3/Tunnel1 | |

In the newly created FIB item, the tunnel index Tunnel1 of the EVI extension tunnel between the ED401 and the ED403 is taken as the encapsulation information of the EVI extension tunnel, and the port3 of the EVI extension tunnel is taken as the EVI network outbound interface, which is connected to the EVI public network.

The ED401 removes the Ethernet header of the Ethernet packet received from the host 421, searches for a FIB item based on the destination IP address 3.3.3.9, and adds the EVI extension tunnel header and the public layer 2 header for the IP packet based on the tunnel index of the EVI extension tunnel in the FIB item so as to generate an IP over IP GRE packet. The VLAN ID of the public layer 2 header corresponds to a ID of VLAN in the EVI public network, the destination MAC address of the public layer 2 header is a MAC address of a next-hop device connected to the ED403, and the source MAC address of the public layer 2 header is the MAC address of the ED401. The ED401 sends the IP over IP GRE packet through the EVI public outbound interface, that is, port3, thereby sending the IP over IP GRE packet containing the IP packet to the remote ED403 through the EVI extension tunnel1 between the ED401 and the ED403.

The ED403 receives the IP over IP GRE packet, removes the public layer 2 header and the EVI extension tunnel header, searches the FIB for a FIB item matching the destination IP address 3.3.3.9 of the IP packet based on the destination IP address 3.3.3.9 of the IP packet, and encapsulates the IP packet into an Ethernet packet. The destination MAC address of the Ethernet packet is the MAC address of the host 423, the source MAC address is the MAC address of the VLAN300 gateway on the ED403, and the VLAN ID is VLAN 300 in the outbound interface. The ED403 sends the Ethernet packet to the host 423 through the port 1of the VLAN300.

When the host 423 accesses the host 421, the host 423 sends an ARP request packet for the MAC address of the VLAN300 gateway. The ED403 receives the ARP request packet from the host 423. If the ED403 determines that the FIB item has been configured, the ED403 generates an ARP response packet and sends the ARP response packet to the host 423.

According to the ARP response packet received from the ED403, the host 423 encapsulates the IP packet to be sent to the host 421 into an Ethernet packet, and sends the Ethernet packet to the ED403. The ED403 receives the Ethernet packet from the host 423.I If the ED403 determines to perform layer 3 forwarding based on the MAC table of the EVI forwarding instance, the ED403 searches the FIB for an FIB item based on the destination IP address 1.0.0.7 of the Ethernet packet received from the host 423.

The ED403 removes the Ethernet header of the Ethernet packet received from the host 423, and adds the EVI extension tunnel header (including the IP packet header and the GRE header) and the public layer 2 header to the IP packet based on the FIB item matching the destination IP address 1.0.0.7 so as to generate an IP over IP GRE packet. The ED403 sends the IP over IP GRE packet including the IP packet to the remote ED401 through the EVI extension tunnel between the ED403 and the ED401.

The ED401 receives the IP over IP GRE packet, removes the public layer 2 header and the EVI extension tunnel header, searches the FIB for an FIB item matching the destination IP address 1.0.0.7 of the IP packet based on the destination IP address 1.0.0.7 of the IP packet. The ED401 obtains the MAC address of the host 421 based on the ARP item index ARP1 in the FIB item, encapsulates the IP packet into an Ethernet packet, and sends the Ethernet packet to the CE411 through the outbound interface port 1of the VLAN100. The CE411 sends the received Ethernet packet to the host 421.

In FIG. 4, the ED401 receives the Ethernet Over IP GRE packet from an external network, and a process of sending the Ethernet Over IP GRE packet to the hosts of local site and other sites in the EVI forwarding instance by the ED401 includes the following blocks.

In block 4001, the ED401 decapsulates the Ethernet Over IP GRE packet based on a Tunnel Termination Table, and removes the public layer 2 header (outside Ethernet header) and the EVI extension tunnel header so as to generate the Ethernet packet.

In block 4002, the ED401 determines to perform layer 3 forwarding according to a layer 2 forwarding item matching the VLAN ID and the destination MAC address of the generated Ethernet packet.

In block 4003, the ED401 removes the Ethernet header of the Ethernet packet, and searches the FIB for a FIB item matching the destination IP address. Suppose the destination IP address is the IP address 3.3.3.9 of the host 423, the ED401 adds the EVI extension tunnel header (including the IP packet header and the GRE header) and the public layer 2 header for the IP packet based on the tunnel index tunnel2 in the FIB item so as to generate an IP over IP GRE packet, and sends the generated IP over IP GRE packet through the EVI public outbound interface port3, thereby sending the IP over IP GRE packet containing the IP packet to the remote ED403 through the EVI extension tunnel between the ED401 and the ED403.

In block 4004, the ED403 receives the IP over IP GRE packet, decapsulates the IP over IP GRE packet into the IP packet, and searches for a FIB item matching the destination IP address 3.3.3.9 of the IP packet based on the destination IP address 3.3.3.9 of the IP packet. The ED403 obtains the MAC address of the host 423 based on the ARP item index ARP3 in the FIB item, and encapsulates the IP packet into an Ethernet packet. In the Ethernet packet, the destination MAC address is the MAC address of the host 423, the source MAC address is the MAC address of the VLAN300 gateway on the ED403, and the VLAN ID is VLAN 300 in the outbound interface. The ED403 sends the Ethernet packet through the VLAN outbound interface port1, thereby sending the Ethernet packet to the host 423.

It should be noted that, in block 4003, if the destination IP address of the generated IP packet is the IP address 1.0.0.7 of the host 421, the ED401 obtains the MAC address of the host 421 according to the ARP item index ARP1 in the FIB item, and adds a new Ethernet header to the IP packet. In the new Ethernet header, the source MAC address is the MAC address of the VLAN100 gateway on the ED401, the destination MAC address is the MAC address of the host 421, and the VLAN ID is VLAN 100 in the outbound interface. The ED401 sends the Ethernet packet through the VLAN outbound interface port1, thereby sending the Ethernet packet to the host 421.

The above process includes both a process of packet forwarding by each ED and a process of configuring FIB items and learning MAC items and ARP items of an EVI forwarding instance. In practical applications, the sequence of packet forwarding may be different from the above sequence. The above process cannot be used to limit the present disclosure.

For example, the ED401-ED404 each receives a free ARP request packet from a host of a local site, and configures a FIB item of the host of the local site in the FIB. Or, the ED401-ED404 receive an ARP request packet or an ARP response packet sent to them, and configures the FIB item, thereby decreasing the number of configured FIB items. For example, the ED401 does not need to configure an FIB item corresponding to VLAN100 gateway on the ED403, and the ED403 does not need to configure a FIB item corresponding to VLAN100 gateway on the ED401.

The examples describe a mode of configuring FIB items, and in practical applications, the fields of a FIB item configured by the ED may be different from the fields of the FIB item described in the examples of the present disclosure.

For example, when an ED receives the ARP request packet, the ED records the Ethernet encapsulation information and the VLAN outbound interface in a specific field of a FIB item. Or, the ED generates an Ethernet encapsulation item based on the received ARP request packet, and records the index of the Ethernet encapsulation item in the specific field of the FIB item.

When an ED receives an ARP request packet contained in an Ethernet over IP GRE packet, the ED generates an EVI extension tunnel encapsulation item, and records the index of the EVI extension tunnel encapsulation item in a specific field of the FIB item.

According to examples of the present disclosure, a field of the FIB item is to record the relationship between the IP address and the encapsulation information of the EVI extension tunnel as well as the public outbound interface or the relationship between the IP address and the Ethernet encapsulation information as well as the VLAN outbound interface.

The ED401-ED404 each receives an Ethernet packet from a host of a local site or receive an Ethernet over IP GRE packet from an external network, searches a MAC table based on the destination MAC address, encapsulates the Ethernet packet into an Ethernet over IP GRE packet based on the public layer 2 header and the EVI tunnel header in an item matching the destination MAC address, and sends the Ethernet over IP GRE packet to another ED in the EVI forwarding instance through the EVI tunnel, thereby implementing layer 2 forwarding in the EVI forwarding instance.

Figure 5:
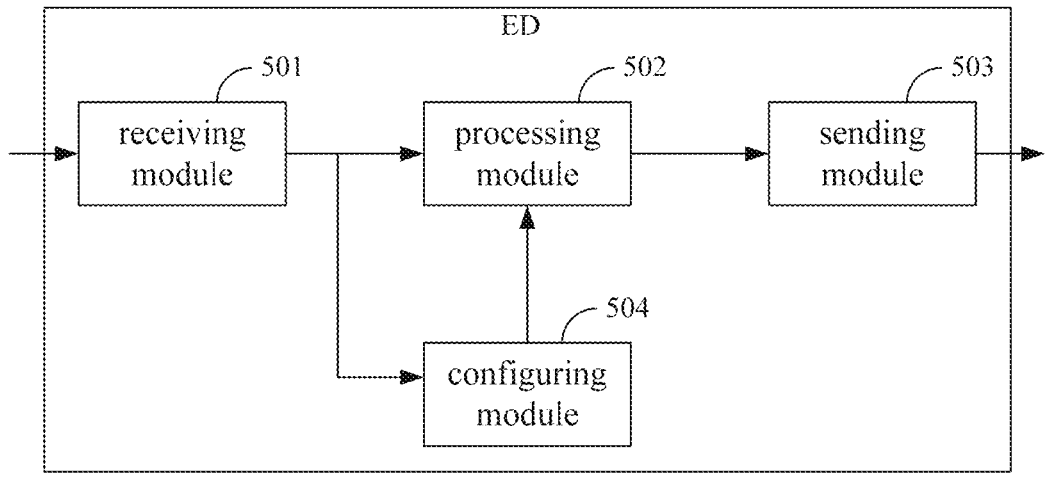
FIG. 5 is a schematic diagram illustrating the structure of an ED according to examples of the present disclosure.

An ED is provided according to an example, which is applied to an EVI network, referring to FIG. 5. FIG. 5 is a schematic diagram illustrating the structure of an ED applied to the above method according to examples of the present disclosure. The ED includes a receiving module 501, a processing module 502, and a sending module 503.

The receiving module 501 receives an Ethernet packet.

The processing module 502 searches a layer 2 forwarding table based on the destination MAC address of the received Ethernet packet. If the processing module 502 determines to perform layer 3 forwarding based on a layer 2 forwarding item found in the search, the processing module 502 searches a FIB based on the destination IP address of the received Ethernet packet. If the processing module 502 determines that a FIB item found in the search includes encapsulation information of EVI extension tunnel and a public outbound interface that are associated with the destination IP address, the processing module 502 removes an original Ethernet header of the received Ethernet packet, decapsulates the Ethernet packet into an IP packet, adds a public layer 2 header and an EVI extension tunnel header for the IP packet based on the encapsulation information of the EVI extension tunnel, and encapsulates the IP packet into an IP over IP GRE packet.

The sending module 503 sends the IP over IP GRE packet through the public outbound interface.

The receiving module 501 further receives an IP over IP GRE packet.

The processing module 502 further removes the public layer 2 header and the EVI extension tunnel header from the received IP over IP GRE packet, decapsulates the received IP over IP GRE packet into an IP packet. The processing module 502 searches the FIB based on the destination IP address of the IP packet, and if the processing module 502 determines that a FIB item found in the search includes Ethernet encapsulation information and a VLAN outbound interface that associated with the destination IP address, the processing module 502 adds a new Ethernet header for the IP packet based on the Ethernet encapsulation information, and encapsulates the IP packet into a new Ethernet packet.

The sending module 503 further sends the new Ethernet packet through the found VLAN outbound interface.

The receiving module 501 receives an Ethernet over IP GRE packet containing an Ethernet packet.

The processing module 502 further removes the public layer 2 header and the EVI tunnel header from the received Ethernet over IP GRE packet, and decapsulates the received Ethernet over IP GRE packet into an Ethernet packet. The processing module 502 searches the layer 2 forwarding table based on the destination MAC address of the Ethernet packet. If the processing module 502 determines to perform layer 3 forwarding based on a layer 2 forwarding item found in the search, the processing module 502 searches the FIB based on the destination IP address of the Ethernet packet. When the processing module 502 determines that the FIB item found in the search includes the encapsulation information of the EVI extension tunnel and the public outbound interface that associated with the destination IP address, the processing module 502 removes the Ethernet header from the Ethernet packet to generate an IP packet. The processing module 502 adds the public layer 2 header and the EVI extension tunnel header to the IP packet based on the encapsulation information of the EVI extension tunnel, and encapsulates the IP packet into an IP over IP GRE packet. The sending module 503 sends the IP over IP GRE packet through the public outbound interface in the FIB item found in the search. If the processing module 502 determines that the FIB item found in the search includes the Ethernet encapsulation information and the VLAN outbound interface that are associated with the destination IP address, the processing module 502 removes the Ethernet header from the Ethernet packet and generates an IP packet based on the FIB item, adds a new Ethernet header to the IP packet based on the Ethernet encapsulation information in the FIB item found in the search, and encapsulates the IP packet into a new Ethernet packet. The sending module 503 sends the new Ethernet packet through the found VLAN outbound interface.

The ED further includes a configuring module 504.

If the configuring module 504 determines that a received Ethernet over IP GRE packet includes an ARP request packet, the configuring module 504 configures a FIB item in the FIB, where the configured FIB item includes the IP address and the encapsulation information of the EVI extension tunnel and the public outbound interface that are associated with the IP address. If the configuring module 504 determines that a received Ethernet packet includes an ARP request packet, the configuring module 504 configures an FIB item in the FIB, where the configured FIB item contains the IP address and the Ethernet encapsulation information and the VLAN outbound interface which are associated with the IP address.

Figure 6:
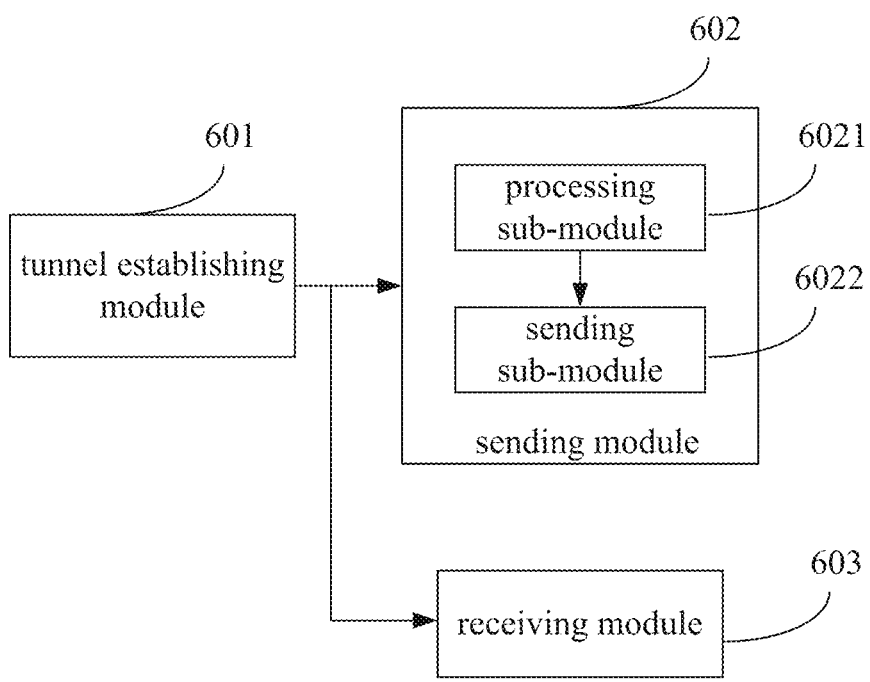
FIG. 6 is a schematic diagram illustrating the structure of an ED according to examples of the present disclosure.

FIG. 6 is a schematic diagram illustrating the structure of an ED according to examples of the present disclosure. As shown in FIG. 6, the ED includes a tunnel establishing module 601 and a sending module 602.

The tunnel establishing module 601 is to establish a first EVI tunnel for bearing Ethernet packets and a first EVI extension tunnel for bearing IP packets. Both the first EVI tunnel and the first EVI extension tunnel are connected to a peer ED.

The sending module 602 is to send, through the first EVI tunnel, an Ethernet packet for layer 2 forwarding in an EVI forwarding instance, and to send, through the first EVI extension tunnel, an IP packet for layer 3 forwarding in the EVI forwarding instance.

The sending module 602 includes a processing sub-module 6021 and a sending sub-module 6022.

The processing sub-module 6021 is to search a FIB based on a destination IP address of the IP packet, and encapsulate an IP packet into an IP over IP GRE packet including a public layer 2 header and a first EVI extension tunnel header based on encapsulation information of the first EVI extension tunnel in a FIB item matching the destination IP address.

The sending sub-module 6022 is to send the IP over IP GRE packet through a public outbound interface in the FIB item matching the destination IP address.

The ED further includes a receiving module 603.

The receiving module 603 is to receive, through a second EVI tunnel, an Ethernet packet for layer 2 forwarding in the EVI forwarding instance, and perform layer 2 forwarding for the received Ethernet packet. The receiving module 603 is to receive, through a second EVI extension tunnel, an IP packet for layer 3 forwarding in the EVI forwarding instance, and perform layer 3 forwarding for the received IP packet.

The second EVI tunnel is connected to a local ED by the peer ED and is used for bearing Ethernet packets, and the second EVI extension tunnel is connected to the local ED by the peer ED and is used for bearing IP packets.

The processing sub-module 6021 is further to, if no FIB item matching the destination IP is found in the FIB, generate an ARP request packet, and send the generated ARP request packet through the first EVI tunnel. The processing sub-module 6021 is to receive an ARP response packet through the second EVI tunnel, and create a new FIB item in the FIB based on a sender IP address of the ARP response packet, encapsulation information of the first EVI extension tunnel, and the public outbound interface.

Figure 7:
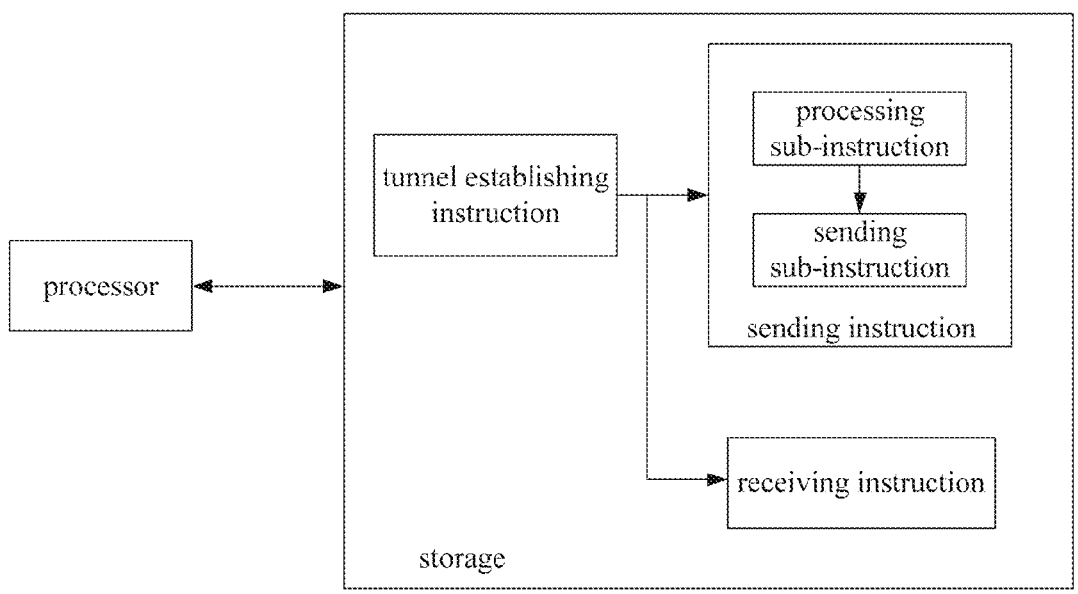
FIG. 7 is a schematic diagram illustrating the structure of an ED according to examples of the present disclosure.

FIG. 7 is a schematic diagram illustrating the structure of an ED according to examples of the present disclosure. As shown in FIG. 7, the ED at least includes storage and a processor communicated with the storage. The storage includes a tunnel establishing instruction and a sending instruction that can be executed by the processor.

The tunnel establishing instruction is to establish a first EVI tunnel for bearing Ethernet packets and a first EVI extension tunnel for bearing IP packets. Both the first EVI tunnel and the first EVI extension tunnel are connected to a peer ED.

The sending instruction is to send, through the first EVI tunnel, an Ethernet packet for layer 2 forwarding in an EVI forwarding instance, and to send, through the first EVI extension tunnel, an IP packet for layer 3 forwarding in the EVI forwarding instance.

The sending instruction includes a processing sub-instruction and a sending sub-instruction.

The processing sub-instruction is to search a FIB based on a destination IP address of the IP packet, and encapsulate the IP packet into an IP over IP GRE packet containing a public layer 2 header and a first EVI extension tunnel header based on encapsulation information of the first EVI extension tunnel in a FIB item matching the destination IP address.

The sending sub-instruction is to send the IP over IP GRE packet through a public outbound interface in the FIB item matching the destination IP address.

The ED further includes a receiving instruction.

The receiving instruction is to receive, through a second EVI tunnel, an Ethernet packet for layer 2 forwarding in the EVI forwarding instance, and perform layer 2 forwarding for the received Ethernet packet. The receiving instruction is to receive, through a second EVI extension tunnel, an IP packet for layer 3 forwarding in the EVI forwarding instance, and perform layer 3 forwarding for the received IP packet.

The second EVI tunnel is connected to a local ED by the peer ED and is used for bearing the Ethernet packets, and the second EVI extension tunnel is connected to the local ED by the peer ED and is used for bearing the IP packets.

The processing sub-instruction is further to, if no FIB item matching the destination IP is found in the FIB, generate an ARP request packet, and send the generated ARP request packet through the first EVI tunnel. The processing sub-instruction is to receive an ARP response packet through the second EVI tunnel, and create a new FIB item in the FIB based on a sender IP address of the ARP response packet, encapsulation information of the first EVI extension tunnel, and the public outbound interface.

The modules are divided based on logic functions. In practical applications, the function of one module may be implemented by multiple modules, or the functions of multiple modules may be implemented by one module. In other examples of the present disclosure, the ED may include other modules.

The methods and devices described herein may be implemented by hardware, host-readable instructions or a combination of hardware and host-readable instructions. Host-readable instructions used in the examples disclosed herein may be stored in a storage medium readable by multiple processors, such as hard drive, CD-ROM, DVD, compact disk, floppy disk, magnetic tape drive, RAM, ROM or other proper storage device. Or, at least part of the host-readable instructions may be substituted by specific-purpose hardware, such as custom integrated circuits, gate array, FPGA, PLD and specific-purpose computers and so on.

A host-readable storage medium is also provided, which is to store instructions to cause a host to execute a method as described herein. Specifically, a system or apparatus having a storage medium that stores host-readable program codes for implementing functions of any of the above examples and that may make the system or the apparatus (or CPU or MPU) read and execute the program codes stored in the storage medium.

In this situation, the program codes read from the storage medium may implement any one of the above examples, thus the program codes and the storage medium storing the program codes are part of the technical scheme.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

It should be noted that, alternatively to the program codes being executed by a computer, at least part of the operations performed by the program codes may be implemented by an operation system running in a computer following instructions based on the program codes to realize a technical scheme of any of the above examples.

In addition, the program codes implemented from a storage medium are written in a storage in an extension board inserted in the computer or in a storage in an extension module connected to the computer. For example, a CPU in the extension board or the extension module executes at least part of the operations according to the instructions based on the program codes to realize a technical scheme of any of the above examples.

In the above-mentioned examples, the ED serves as a gateway accessed by the user, obtains information about an outbound interface through searching a FIB and forwards a packet to a destination host. And thus, the ED device implements layer 3 forwarding and layer 2 forwarding in an EVI forwarding instance, thereby extending the layer 2 access mode of the EVI network and optimizing the network.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for forwarding a packet by an Edge Device (ED), comprising:
   establishing a first Ethernet Virtual Interconnection (EVI) tunnel for bearing Ethernet packets and a first EVI extension tunnel for bearing IP packets, both of the first EVI tunnel and the first EVI extension tunnel being connected to a peer ED;
   sending, through the first EVI tunnel, an Ethernet packet for layer 2 forwarding in an EVI forwarding instance;
   searching a Forwarding Information Base (FIB) based on a destination IP address of an IP packet;
   in response to finding an FIB entry matching the destination IP address:
      encapsulating the IP packet into an IP over IP Generic Routing Encapsulation (GRE) packet containing a public layer 2 header and a first EVI extension tunnel header based on encapsulation information of the first EVI extension tunnel in the FIB entry matching the destination IP address; and
      sending, through the first EVI extension tunnel, the IP over IP GRE packet through a public outbound interface in the FIB entry matching the destination IP address;
   in response to not finding an FIB entry matching the destination IP address, generating an Address Resolution Protocol (ARP) request packet and sending the generated ARP request packet through the first EVI tunnel; and
   receiving an ARP response packet through a second EVI tunnel, and creating a new FIB entry in the FIB based on a sender IP address of the ARP response packet, the encapsulation information of the first EVI extension tunnel, and the public outbound interface.

2. The method of claim 1, further comprising:
   receiving, through a second EVI tunnel, another Ethernet packet for layer 2 forwarding in the EVI forwarding instance, and performing layer 2 forwarding for the another Ethernet packet;
   receiving, through a second EVI extension tunnel, another IP packet for layer 3 forwarding in the EVI forwarding instance, and performing layer 3 forwarding for the another IP packet, wherein:
      the second EVI tunnel is connected to the ED by the peer ED and is used for bearing Ethernet packets, and the second EVI extension tunnel is connected to the ED by the peer ED and is used for bearing IP packets.

3. The method of claim 1, wherein the ED is connected to a first site, the peer ED is connected to a second site, and a host in the first site and a host in the second site respectively belong to different Virtual Local Area Networks.

4. The method of claim 1, further comprising removing an Ethernet header of the Ethernet packet.

5. The method of claim 1, further comprising the peer ED receiving the IP over IP GRE packet, decapsulating the IP over IP GRE packet into the IP packet, and performing layer 3 forwarding for the IP packet.

6. The method of claim 1, wherein the first EVI tunnel and the first EVI extension tunnel are each bidirectional.

7. The method of claim 1, wherein the ARP response packet comprises a sender MAC address, a sender IP address, a target MAC address, and a target IP address.

8. An Edge Device (ED) comprising a processor and a non-transitory machine-readable storage medium, comprising instructions executable by the processor to:
   establish a first Ethernet Virtual Interconnection (EVI) tunnel for bearing Ethernet packets and a first EVI extension tunnel for bearing IP packets, both of the first EVI tunnel and the first EVI extension tunnel being connected to a peer ED; and
   send, through the first EVI tunnel, an Ethernet packet for layer 2 forwarding in an EVI forwarding instance; and
   search a Forwarding Information Base (FIB) based on a destination IP address of an IP packet;
   in response to finding an FIB entry matching the desination IP address:
      encapsulate the IP packet into an IP over IP Generic Routing Encapsulation (GRE) packet containing a public layer 2 header and a first EVI extension tunnel header based on encapsulation information of the first EVI extension tunnel in the FIB entry matching the destination IP address; and
      send, through the first EVI extension tunnel, the IP over IP GRE packet through a public outbound interface in the FIB entry matching the destination IP address;
   in response to not finding an FIB entry matching the destination IP address, generate an Address Resolution Protocol (ARP) request packet and send the generated ARP request packet through the first EVI tunnel; and
   receive an ARP response packet through a second EVI tunnel, and create a new FIB entry in the FIB based on a sender IP address of the ARP response packet, the encapsulation information of the first EVI extension tunnel, and the public outbound interface.

9. The ED of claim 8, the storage medium further comprising instructions to:
  receive, through a second EVI tunnel, another Ethernet packet for layer 2 forwarding in the EVI forwarding instance, and perform layer 2 forwarding for the another Ethernet packet;
  receive, through a second EVI extension tunnel, another IP packet for layer 3 forwarding in the EVI forwarding instance, and perform layer 3 forwarding for the another IP packet, wherein:
    the second EVI tunnel is connected to the ED by the peer ED and is used for bearing Ethernet packets, and the second EVI extension tunnel is connected to the ED by the peer ED and is used for bearing IP packets.

10. The ED of claim 8, wherein the ED is connected to a first site, the peer ED is connected to a second site, and a host in the first site and a host in the second site respectively belong to different Virtual Local Area Networks.

11. The ED of claim 8, the storage medium further comprising instructions to remove an Ethernet header of the Ethernet packet.

12. The ED of claim 8, the storage medium further comprising instructions to cause the peer ED to receive the IP over IP GRE packet, decapsulate the IP over IP GRE packet into the IP packet, and perform layer 3 forwarding for the IP packet.

13. The ED of claim 8, wherein the first EVI tunnel and the first EVI extension tunnel are each bidirectional.

14. The ED of claim 8, wherein the ARP response packet comprises a sender MAC address, a sender IP address, a target MAC address, and a target IP address.

\* \* \* \* \*